B. W. ELDER.
NUTCRACKING MACHINE.
APPLICATION FILED AUG. 18, 1910.

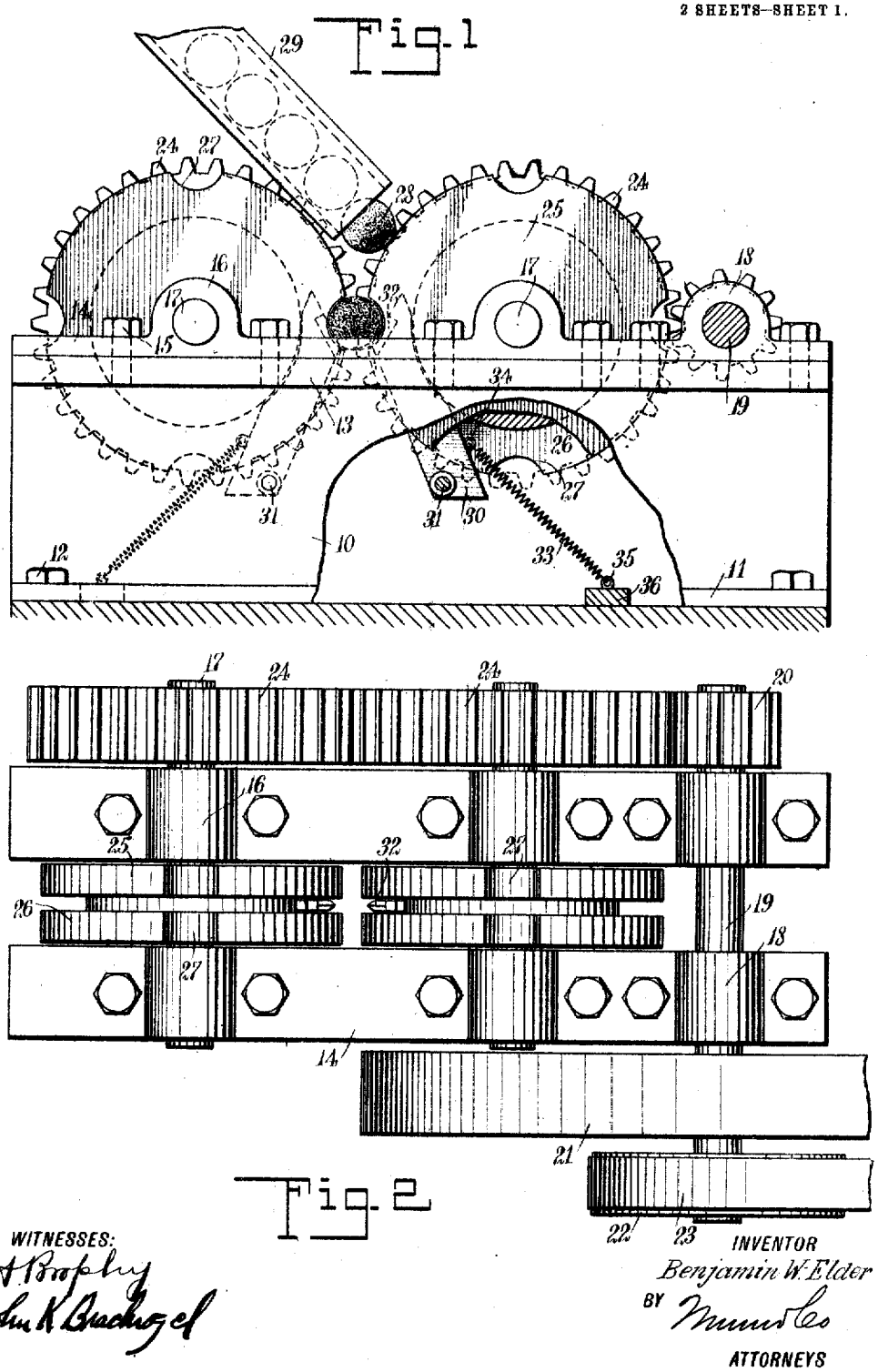

998,481.

Patented July 18, 1911.

2 SHEETS—SHEET 2.

WITNESSES:
J. A. Brophy
John K. Brachvogel

INVENTOR
Benjamin W. Elder
BY
Munn & Co
ATTORNEYS

UNITED STATES PATENT OFFICE.

BENJAMIN W. ELDER, OF SAN ANTONIO, TEXAS.

NUTCRACKING-MACHINE.

998,481.   Specification of Letters Patent.   Patented July 18, 1911.

Application filed August 18, 1910. Serial No. 577,790.

*To all whom it may concern:*

Be it known that I, BENJAMIN W. ELDER, a citizen of the United States, and a resident of San Antonio, in the county of Bexar and State of Texas, have invented a new and Improved Nutcracking-Machine, of which the following is a full, clear, and exact description.

This invention relates to machines for cracking nuts of different kinds, and has reference more particularly to a machine of this class which comprises a pair of movable members, means for actuating the same, and a cutter, the members having means for holding between them a nut, and serving to carry the same into engagement with and past the cutter, to effect the severing of the shell of the nut.

The object of the invention is to provide a simple, strong and durable machine for cracking or severing the shells of different kinds of nuts, by means of which nuts having the heaviest shells can be easily opened without injuring the kernels thereof, which is simple and compact in form, so that it can be easily carried from place to place, which is rapid in operation, which requires little power to drive it, and which can be inexpensively manufactured.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 3:
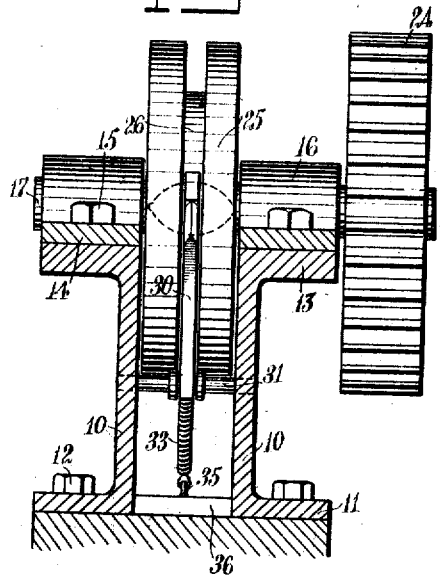
Figure 4:
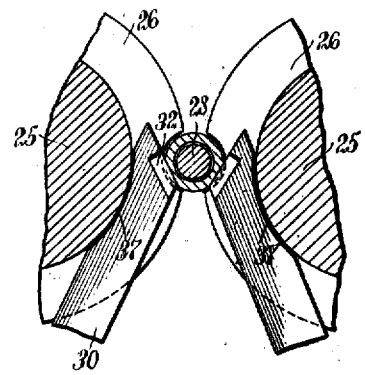
Figure 5:
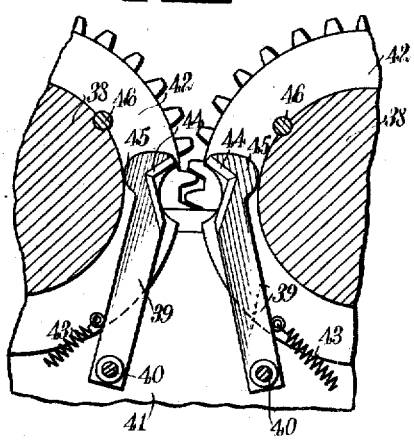
Figure 6:
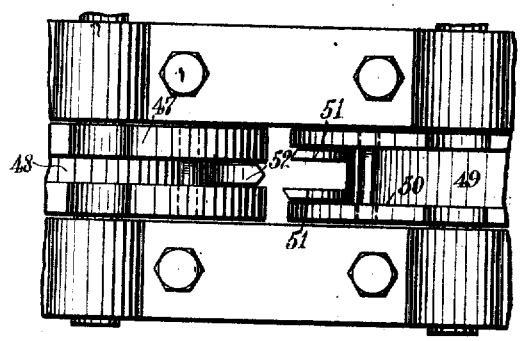
Figure 7:
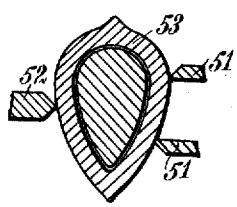

Figure 1 is a side elevation of an embodiment of my invention, showing parts of the machine broken away; Fig. 2 is a plan view of the machine; Fig. 3 is a transverse section of the machine; Fig. 4 is a fragmentary, longitudinal section, showing parts of the movable members and the cutter; Fig. 5 is a view similar to Fig. 4, showing parts of a modified form of the machine; Fig. 6 is a fragmentary plan view of a further modified form of the machine; and Fig. 7 is a horizontal section showing parts of the cutters of modified form, and a nut between them.

Before proceeding to a more detailed explanation of my invention, it should be clearly understood that while the machine is particularly useful in opening nuts which have very thick and hard shells, it can also be advantageously employed in connection with nuts or like objects which are more easily shelled. I have found that the machine is particularly useful in cracking the shell of the "coquito" nut, or the *Attalea cohune*, and the Mexican palm nut, *Elæis melanococca*. These nuts and other similar ones have very thick and hard shells, which render it extremely difficult to free the kernel, which contains a large percentage of useful oil, and is a valuable natural product. In my machine the nuts are gripped and held between movable members, and forced into engagement with and past cutter blades which are driven into the shells and sever the same, the shell splitting sufficiently under these circumstances, so that the kernel can be removed. The parts are so proportioned that the blade will not penetrate into the kernel and injure the same. Certain of the details of construction, shown for example herewith, form no part of the invention, and can be varied in accordance with individual preference and special conditions, without departing from the underlying spirit of the invention.

Referring more particularly to the drawings, I provide a suitable supporting base, consisting of parallel members 10, having flanges 11 which can be secured by means of bolts 12, upon a support or foundation. The members 10, at the upper edges have laterally disposed flanges 13 upon which are secured bearing strips 14, by means of bolts 15. The bearing strips have spaced bearings 16, in which are journaled spindles 17 extending transversely of the base. The bearing strips have further bearings 18, in which is journaled a shaft 19, the ends of which project laterally beyond the base. The shaft 19 has at one end a driving pinion 20, and at the other end a fly wheel 21 and a pulley 22, by means of which it can be connected through the agency of the belt 23, with a suitable source of power. The ends of the spindles 17, corresponding to that end of the shaft 19 which has the pinions 20, are extended laterally beyond the base, and have gears 24 which are in mesh. One of the gears also meshes with the pinion 20, so that the shaft serves to drive the spindles 17 in opposite directions and simultaneously.

Each spindle 17 has keyed or otherwise rigidly secured thereon, between the base members 10, a revoluble member or disk 25. The members are spaced a slight distance apart, and each has a substantially central, peripheral groove 26. The members further, have transverse grooves or recesses 27 formed in the peripheries and constituting pockets to receive and hold the nuts 28, which are fed into position between the members, through a chute 29 or any other suitable feeding device. The members are so proportioned and arranged that the pockets register when they are at the adjacent sides of the members, so that as these turn toward each other, the nuts can be gripped in the pockets and carried through, between the members, as is shown most clearly in Fig. 1. Any suitable number of pockets can be provided, though I have shown for example, in the drawings, four pockets.

Cutter members or blades 30, are arranged between the base members, and are pivotally mounted in position by means of pins 31 extending between the members, and secured in suitable openings thereof. The cutters project upwardly into peripheral grooves 26 of the revoluble members and have inclined cutting edges 32 at the upper ends. The cutters are so arranged that the nuts pass between them through the cutting edges. The backs of the cutters engage the revoluble members and are thus limited in their backward movement, the members serving to force the nuts through between the cutters, the edges of which penetrate the shell. The knives are held in position by means of springs 33 secured to staples or eyes 34 at the back of the knives, and to corresponding staples or eyes 35 carried by cross pieces 36 positioned between the base members. The cutters have the pockets formed with round grooves or recesses 37, at which they engage the revoluble members, as is clearly shown in Fig. 4.

In Fig. 5 is shown a modified form of the invention, in which the revoluble members 38 correspond in general to the members 25 of the preferred form. The cutters 39 are pivotally mounted by means of pins 40, between the sides 41 of the nut-cracking machine base, and are held in normal positions, extending into the grooves 42 of the members 38, by means of springs 43. The cutters have reëntrant, V-shaped cutting edges 44, near the upper ends, and are provided at the back with rounded projections 45, adapted to be engaged by cam studs 46 of the members 38. When the movement of the members brings the cams 46 into engagement with the rounded projections 45, the cutters are forced inwardly toward each other, to increase the splitting action. The springs normally hold the cutters apart so that the nuts carried by the members 38 can assume positions between the V-shaped cutting edges 44, whereupon the knives are forced inwardly to split the shell.

I have found that if the nuts are somewhat pear-shaped there is a tendency if two cutters are used, for the nut to be displaced when the pressure is brought to bear upon the same. To overcome this difficulty I provide a modified form of the device, shown in Figs. 6 and 7, in which one of the revoluble members 47 is similar to the members 25 and has a peripheral groove 48. The other revoluble member 49 has a wider peripheral groove 50, and has associated therewith two cutters 51, spaced apart and opposed to a single cutter 52, which is associated with the revoluble member 48. The remaining elements of this form of the device are similar to those described above in the first instance. When a pear-shaped nut 53 is forced between the cutters it is held, as is shown in Fig. 7, and cannot turn when the cutting edges are forced into the shell. By duplicating the cutters at one side, the splitting action is also enhanced.

Having thus described my invention, I claim as new, and desire to secure by Letters Patent:

1. A machine of the class described, comprising continuously movable members having means for holding and carrying nuts between them, a movable cutter mounted adjacent to said members and arranged to have said members carry the nuts into engagement therewith and past it, to sever the shells of the nuts, and a spring tending to hold said cutter in a normal position, one of said movable members serving to limit the movement of said cutter when the same is being engaged by a nut.

2. A machine of the class described, comprising a pair of revoluble disks arranged to revolve in opposite directions and having pockets at the edges thereof, adapted to register to receive and carry nuts, and a pair of spaced cutters capable of limited relative movement and positioned between said members, whereby said members serve to carry the nuts into engagement with and between said cutters, to sever the shells of the nuts.

3. A machine of the class described, comprising a pair of continuously movable members arranged to revolve in opposite directions and having pockets adapted to register at certain periods of the movements of said members, and to receive and carry nuts, and a pair of spaced cutters positioned under said members, whereby said members serve to carry the nuts into engagement with, and between said cutters, to sever the shells of the nuts, said cutters being movable, and engaging said members whereby their movement away from each other is limited.

4. A machine of the class described, comprising a pair of revoluble members having pockets adapted to register, and to receive and carry nuts fed therebetween, gearing operatively connecting said members, whereby said pockets register in predetermined positions of said members, means for driving said members, and a pair of cutters positioned between said members and adapted to have the nuts carried into engagement therewith, and between the same, said members serving to limit the movements of said cutters, and springs tending to hold said cutters in normal positions.

5. A machine of the class described, comprising a pair of continuously movable members having means for receiving and carrying nuts, a pair of movably mounted carriers adapted to have the nuts forced into engagement therewith to sever the shells of the nuts, and means tending to hold said cutters in normal positions, said members serving to limit the movement of said cutters away from each other, and serving further, to hold said cutters against movement transversely of the planes of said members.

6. A machine of the class described, having a pair of revoluble members adapted to receive and carry nuts between them, and provided with peripheral grooves, and pivoted cutters extending movably into said grooves and adapted to have the nuts brought into engagement therewith to sever the shells thereof.

7. A machine of the class described, comprising a pair of revoluble members, each having a peripheral groove, and further, having transverse pockets formed in the peripheries thereof, said pockets being adapted to receive and carry nuts, cutters movably mounted between said members and each extending into one of said peripheral grooves, and means for holding said cutters in normal positions.

8. A machine of the class described, comprising a pair of revoluble members having pockets adapted to receive and carry nuts, means for simultaneously driving said members, and movably mounted cutters, said revoluble members having means for engaging said cutters, and moving the same toward each other at predetermined intervals.

9. A machine of the class described, comprising a pair of revoluble members, having pockets adapted to receive and carry nuts, means for simultaneously driving said members, and movably mounted cutters, adjacent to said members, said members having cam projections adapted to engage said cutters simultaneously, to cause them to approach each other at predetermined intervals, and springs tending to hold said cutters in normal position.

In testimony whereof I have signed my name to this specification in the presence of two subscribing witnesses.

BENJAMIN W. ELDER.

Witnesses:
JOHN K. BRACHVOGEL,
JOHN P. DAVIS.